March 10, 1931.  M. REID  1,795,680

EXPANSIBLE VULCANIZING MOLD FOR AUTOMOBILE TIRES

Filed Nov. 22, 1928

Matthew Reid
Inventor by Albert E. Dieterich
Attorney

Patented Mar. 10, 1931

1,795,680

UNITED STATES PATENT OFFICE

MATTHEW REID, OF VANCOUVER, BRITISH COLUMBIA, CANADA

EXPANSIBLE VULCANIZING MOLD FOR AUTOMOBILE TIRES

Application filed November 22, 1928. Serial No. 321,090.

This invention relates to tire vulcanizing devices and has special reference to that class of vulcanizing equipment which is designed to treat automobiles or truck tires of several different sizes and diameters.

The provision of steam heated holders or molds for all different sizes and diameters of tires at present in use is a very expensive matter, and much of the piping and equipment has to be duplicated for each size mold.

The object of this invention is to provide an efficient and practical device in which the distance of the sides of the mold from each other is variable, so that tires of different sizes may be readily accommodated, and further by the provision of a series of shaped metal filling pieces, the inside of the mold may be so varied in shape that tires of any diameter, size of tread or section of tread may be efficiently vulcanized and repaired therein.

The nature of the invention is more clearly described by reference to the drawings herewith, which accompany and form part of this application, and in which.

Figure 2:
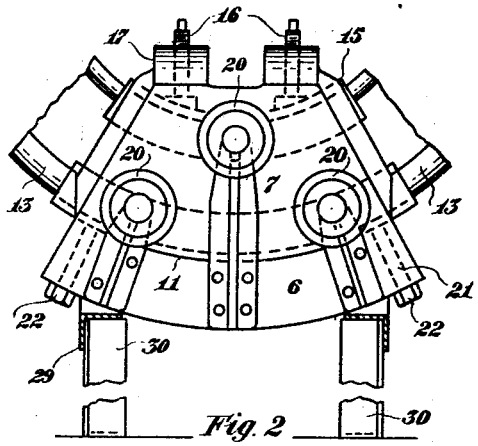
Figure 2 is an end view of the device.
Figure 4:
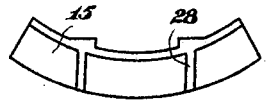
Figure 4 is a side view of one of the bead contact pieces.
Figure 3:
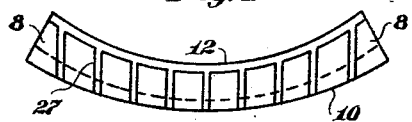
Figure 3 is a side view of one of the tread contact pieces or fillers.
Figure 5:
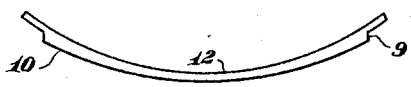
Figure 5 is a side view of one of the central distance pieces used for varying the distance between the tread contact pieces in the mold.

In these views, the numeral 6 indicates one portion of the steam heated mold or chamber which is made L-shaped in section, and one leg of which serves as a support and slide for the other and adjustable portion of the mold, which is indicated at 7. The portion 7 is slidably connected to the portion 6 and can be clamped at any position within its range of movement, so that the distance between the inner opposed parallel faces of the chambers 6 and 7 is variable at will within the capacity range of the device. The two chambers 6 and 7 when so arranged, form a three sided trough with parallel sides and curved bottom into which the tire to be repaired can be inserted, and into each portion of which steam can be passed in order to provide the necessary heat for vulcanization.

The variation in the width of the tires is accommodated by moving the chamber 7 nearer to or further from the chamber 6 before clamping it in position.

The variation in section of the tire treads and also in the outside diameter of tires of different sizes is met by inserting shaped tread fillers 8 in the bottom of the trough before the tire is put in, and variation in the width of the treads themselves is met by inserting between the tread fillers 8 a metal distance piece or pieces 9.

The pieces 8 and 9 are made so that their outside or bottom curvatures as shown at 10 correspond with and fit the curvature 11 of the inside of the horizontal legs of the mold 6, but their inside curvatures as indicated at 12 correspond with and fit the curvature and diameter of the particular tire which is to be treated. The tire is indicated in position at 13. A sufficient number of fillers 8 and of distance pieces 9 is provided to deal with tires of any diameter, size or width of tread within the range capacity of the device.

In order to hold the tire in shape in the mold, internal sausage-shaped hollow pads 14 of rubber or similar flexible material are inserted within the portion of the tire passing through the mold chambers, and these are arranged to be supplied with air or steam under pressure, so that they fit themselves to the inside shape of the tire, and force it outwards into contact with the mold.

Figure 1:
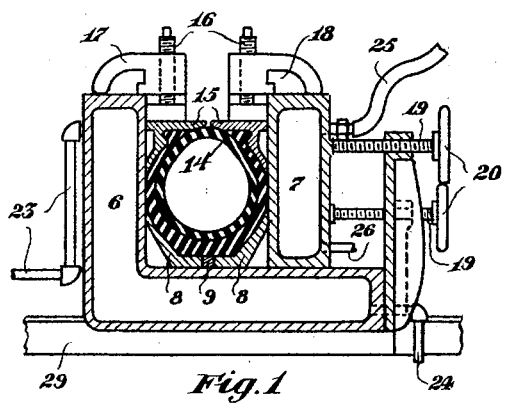
Figure 1 represents a transverse section through the centre of the device, showing a tire in position in the inside of a two-part steam heater mold or vulcanizing chamber, the relative position of the fillers or adjusting pieces in contact with the tire and the clamps for holding the tire and mold.

In order to hold the tires down in close contact with the fillers 8 and 9 and the latter in contact with the hot chamber 6, a pair of curved metal bead pads 15 are placed upon the inside or bead edges of the tire, the sides of the pads extending down the sides of the tire, as shown in Fig. 1; and these pads are kept firmly in position by means of the pressure screws 16 passing through detachable lugs 17 which slidably engage the extensions 18 on the tops of the chambers 6 and 7.

A sufficient number of bead pads 15 of different sizes, shapes and diameters, is provided to deal with the range of tires to be handled by the device.

Side pressure screws 19 are provided in order to keep the mold 7 in position and relieve it from side strain. These screws are tightened up by the hand wheels 20 after the mold has been set and clamped down to the mold 6 by the clamp bolts 21 which move in slots cast through the molds 6.

Steam is provided for the mold 6 through the pipe 23 and condensation is removed through the pipe 24. Steam is provided for the mold 7 through the flexible pipe 25 and condensation removed at 26. Steam is also provided for the internal pad 14 when lining repairs are being made upon a tire.

The fillers 8 are adapted by means of the webs 27 to fit the rectangular sides of the trough when in position, and form good metallic contact so as to readily conduct the heat from the trough walls to the tire, and the bead pads 15 are also provided with webs 28 by which they also are adapted to fit and be guided by the walls of the trough as they are pressed down upon the tire by the screws 16.

The device is shown carried on a light angle iron frame 29 supported by the legs 30.

The operation of the device for the purpose of vulcanizing a tire repair is as follows: Tread fillers 8 of suitable size and curvature to fit the tire to be repaired are placed in the bottom of the trough separated if necessary by a distance piece 9 the proper thickness to cause the combination of pieces 8 and 9 to closely fit in contact with the tire tread. The steam chambers or molds 6 and 7 are then set up to the tread fillers, and clamped at the right distance apart to accommodate the tire section.

The tire is then placed in the trough, with the internal pad 14 in position, the bead pads 15 are then placed and secured by the pressure clamps 17 and screws 16, the side pressure screws 19 are then adjusted against the outside of the chamber 7, and the device is then ready for steam to be turned into the various chambers and the vulcanization of the tire to be carried out.

It is to be particularly noted as a feature of my invention that, owing to the L-shaped construction of the mold 6, and the way in which it overlaps upon the mold 7, the tread of the tire receives the necessary heat all over its width, there being no portion which is not in contact with either the tread fillers 8 or the distance piece 9, all these pieces being in contact with the steam heated mold 7. Vulcanization is therefore uniformly effective no matter what the width of the tread may be.

This feature distinguishes my invention from those possessing two part molds which are adjustable as to distance apart but when so adjusted leave a cold gap or space between them, which, although filled by a metal distance piece, is not in direct contact with the heat supply necessary to vulcanize the centre portion of the tread, this portion, therefore, not being cured or vulcanized as thoroughly as the side portions of the tread. In my invention the tread is uniformly vulcanized and cured, no matter how thick the distance pieces 9 may be.

Having now fully described my invention, what I claim and desire to be protected in by Letters Patent, is:

1. An expansible mold for vulcanizing a section of an automobile tire and comprising a sector-shaped member of L-shaped cross section, a corresponding sector-shaped member of rectangular cross section in slidable engagement with the inner surface of one limb of said L-shaped member thereby forming in combination a cross section of rectangular trough-shaped form in which the interspace is made variable by sliding one member upon the other, a support for said L-shaped member, means for adjustably mounting said rectangular member to slide on said supporting member, adjustable distance pieces between said members and the outer contour of the tire under vulcanization, means for heating the walls of said L-shaped and rectangular members which are adjacent the tire, said distance pieces comprising a plurality of tread molding segments and a plurality of bead molding segments, means on said L-shaped and rectangular members for separately adjusting said bead molding segments toward said tread molding segments, said adjusting means comprising lugs mounted on said L-shaped and rectangular members and adjusting screws carried by said lugs.

2. An expansible mold for vulcanizing a section of an automobile tire and comprising a sector-shaped member of L-shaped cross section, a corresponding sector-shaped member of rectangular cross section in slidable engagement with the inner surface of one limb of said L-shaped member thereby forming in combination a cross section of rectangular trough-shaped form in which the interspace is made variable by sliding one member upon the other, a support for said L-shaped member, means for adjustably mounting said rectangular member to slide on said supporting member, adjustable distance pieces between said members and the outer contour of the tire under vulcanization, means for heating the walls of said L-shaped and rectangular members which are adjacent the tire, said distance pieces comprising a plurality of tread molding segments and a plurality of bead molding segments, means on said L-shaped and rectangular members for separately adjusting said bead molding segments toward said tread molding segments, said adjusting means comprising lugs mounted on said L-shaped and rectangular members, adjusting screws carried by said lugs, and means for detachably mounting said lugs.

In testimony whereof I affix my signature.

MATTHEW REID.